May 25, 1937. W. M. GROSSE 2,081,430
MACHINE FOR PRODUCING RINGLESS FULL FASHIONED HOSIERY
Filed July 14, 1933 6 Sheets-Sheet 1
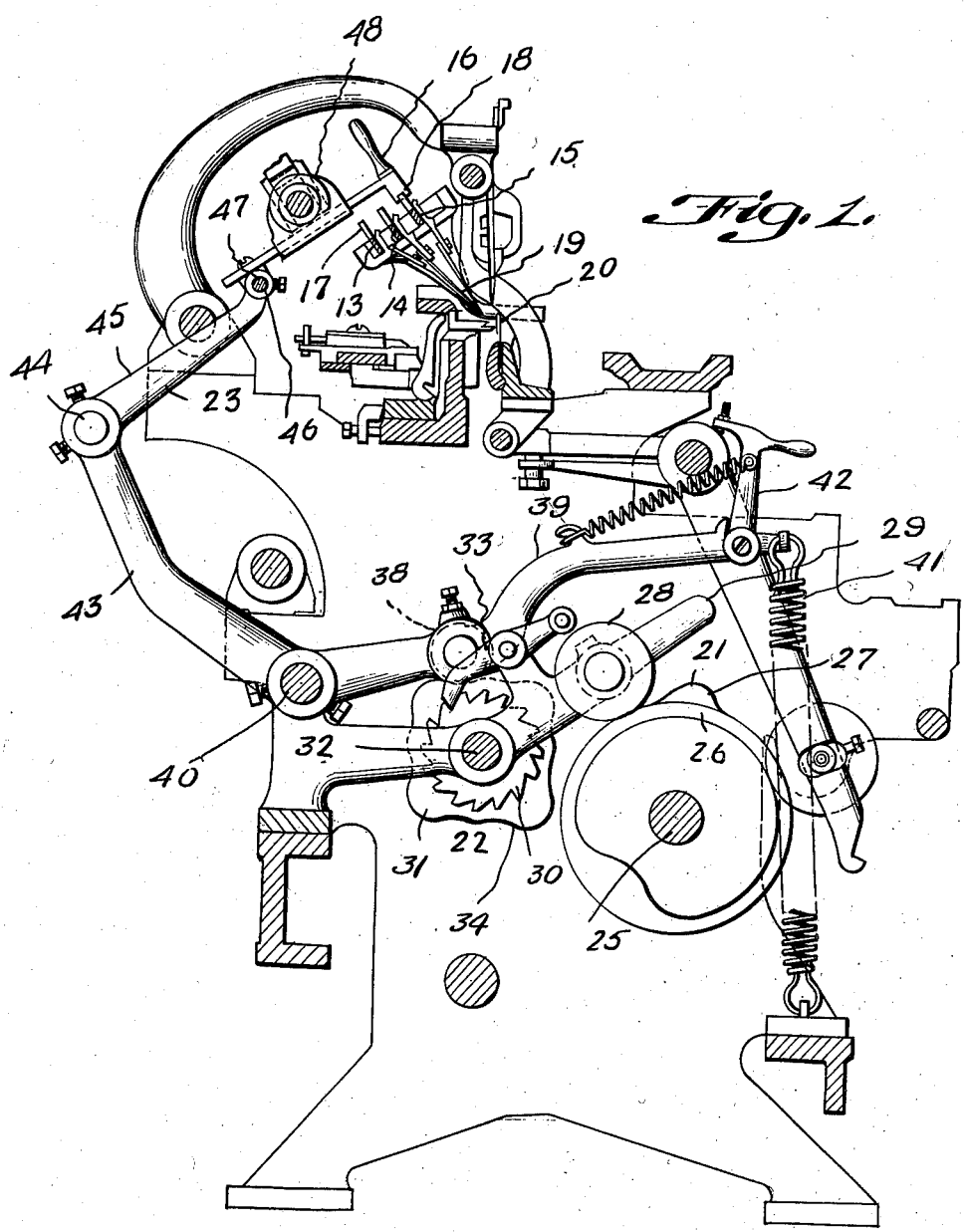
INVENTOR.
William M. Grosse

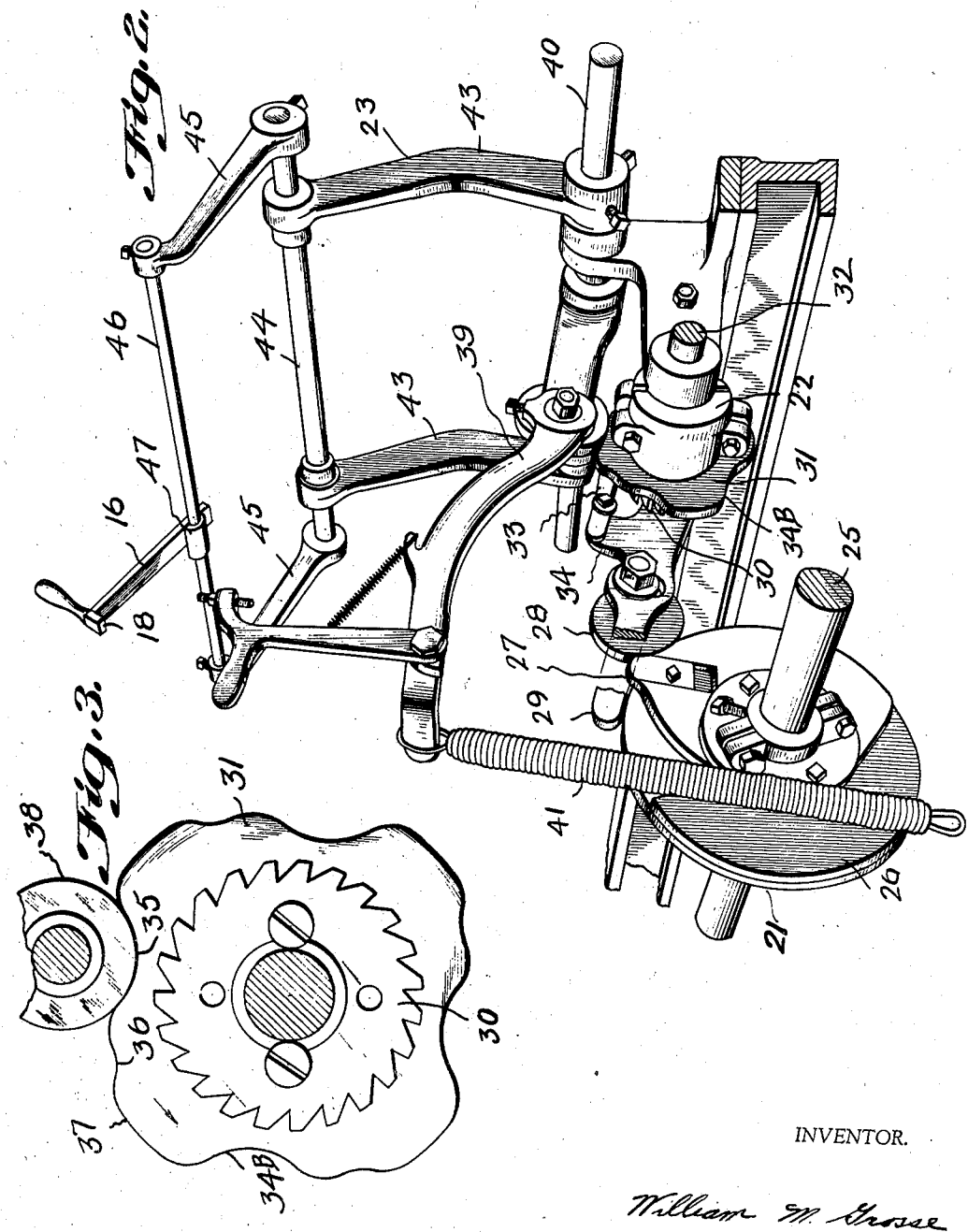

May 25, 1937.  W. M. GROSSE  2,081,430
MACHINE FOR PRODUCING RINGLESS FULL FASHIONED HOSIERY
Filed July 14, 1933  6 Sheets-Sheet 3

INVENTOR.
William M. Grosse

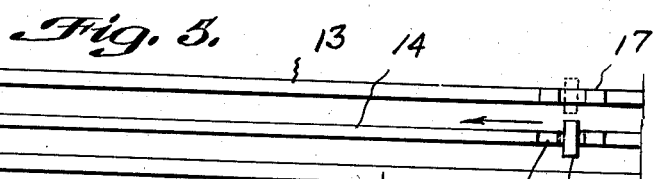
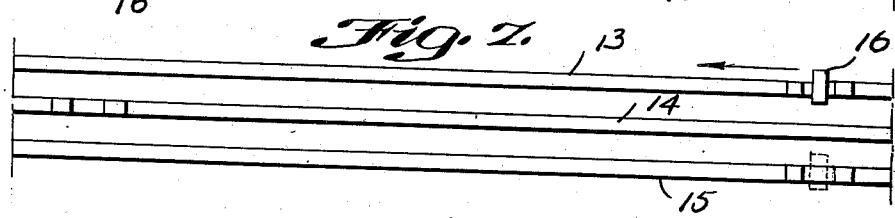
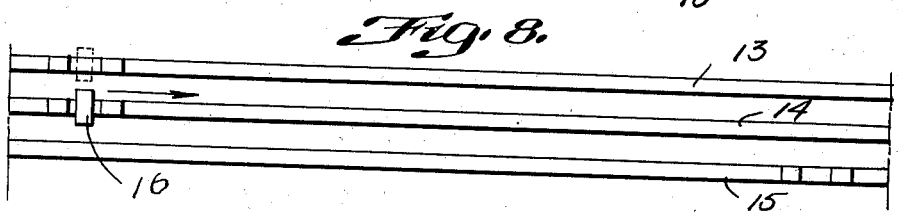
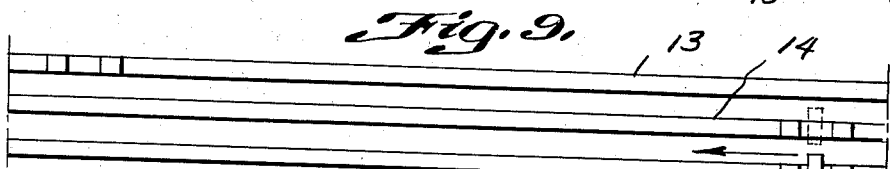
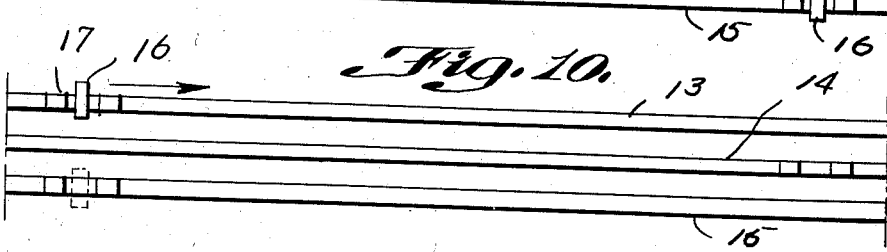
INVENTOR.
William M. Grosse

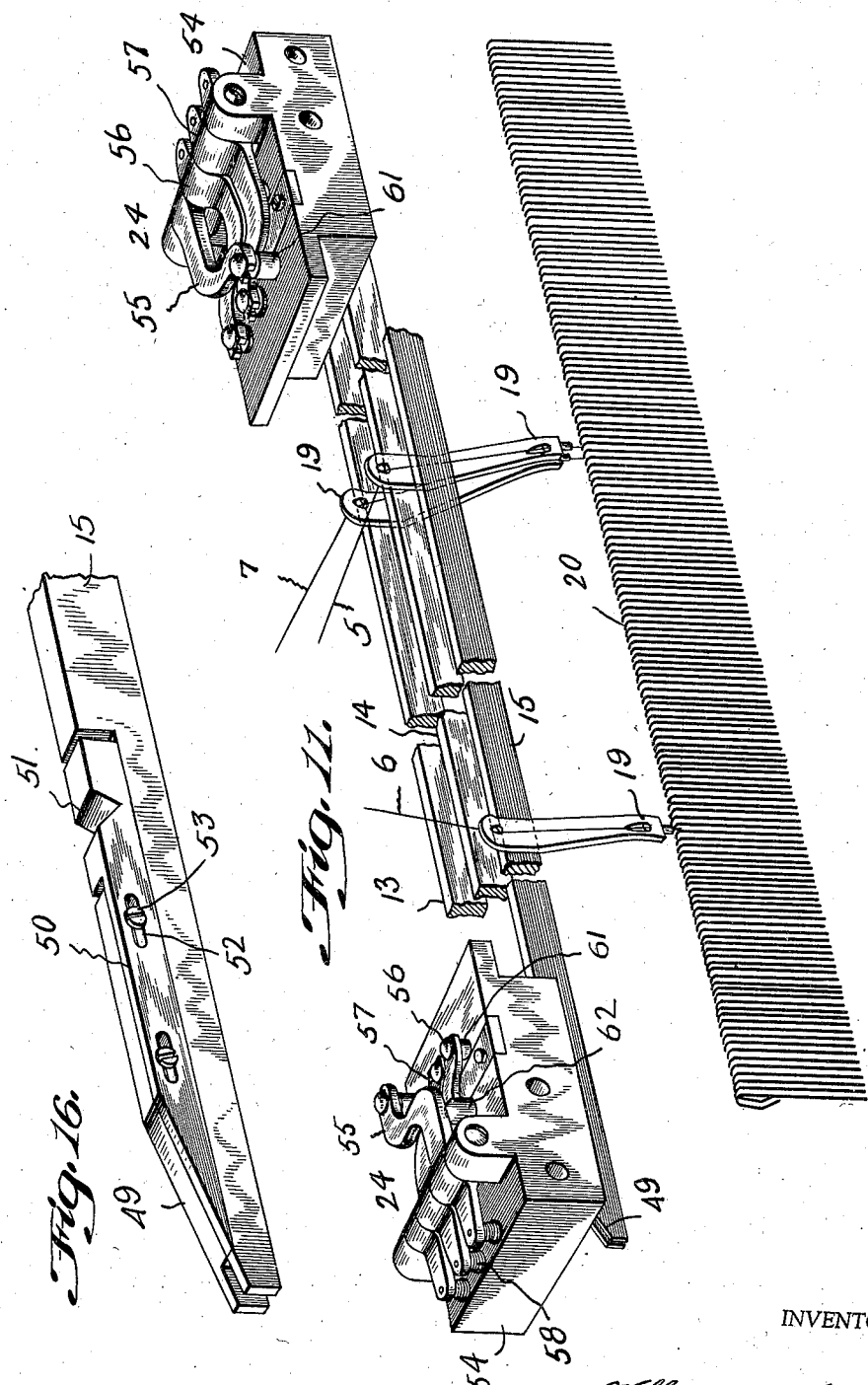

May 25, 1937.  W. M. GROSSE  2,081,430
MACHINE FOR PRODUCING RINGLESS FULL FASHIONED HOSIERY
Filed July 14, 1933  6 Sheets-Sheet 6
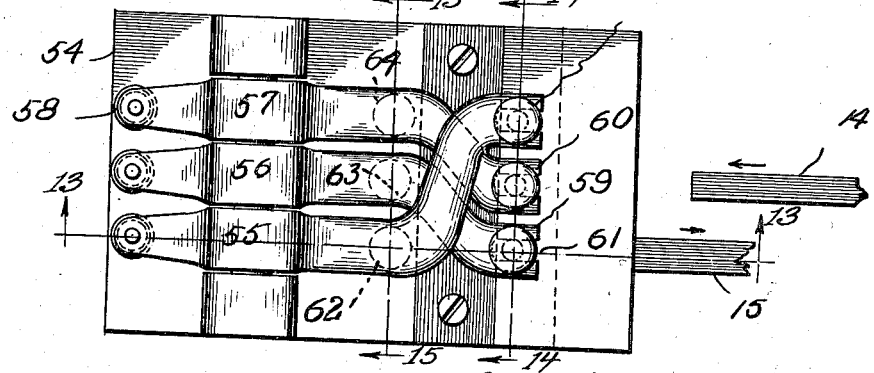
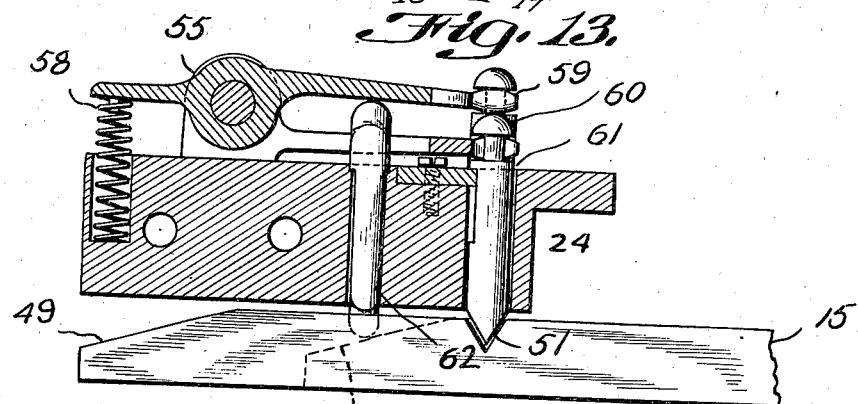
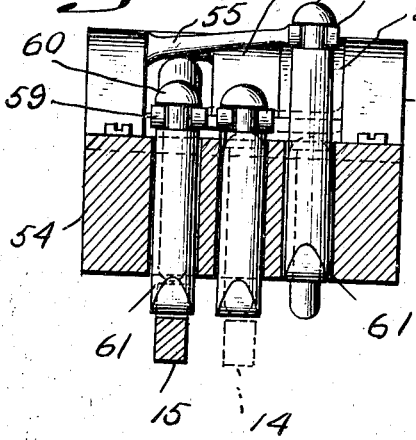
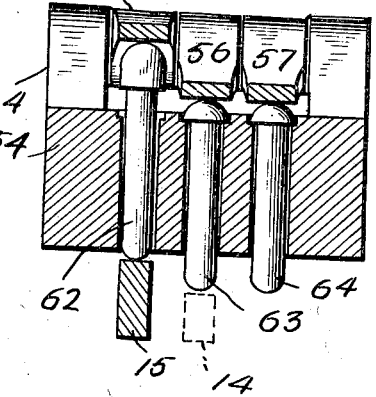
INVENTOR.
William M. Grosse Patented May 25, 1937

2,081,430

UNITED STATES PATENT OFFICE 2,081,430

MACHINE FOR PRODUCING RINGLESS FULL-FASHIONED HOSIERY

William Maurice Grosse, Greensboro, N. C., assignor, by mesne assignments, of one-half to Mock, Judson, Voehringer Co. Inc., a corporation of New York, and one-half to Greensboro Full Fashioned Hosiery Mills, Inc., a corporation of North Carolina Application July 14, 1933, Serial No. 680,383

6 Claims. (Cl. 66—127)

This invention relates to mechanism for knitting hosiery with a view of eliminating the formation of "rings" or "shadows" in the main leg and instep portion of a stocking such as are frequently produced by irregularities occurring in a knitting silk thread drawn from a single continuous source and fed to the needles of the knitting machine continuous for the knitting of immediate succeeding courses of loops.

When irregularities in silk thread, such as relatively thin and relatively thick portions succeed or alternate with each other or with thread portions of normal count, size and weight in and throughout the length of the continuous single knitting thread, such irregular thread lengths when formed into immediate succeeding courses of loops produce variations in the state of transparency of the fabric, particularly "sheer" silk hose to such an extent as to form undesirable "shadows" or "rings" in the stocking, especially when being worn which necessitates the selling of such stockings as "seconds" at greatly reduced prices.

The principal object of my invention resides in providing mechanism selectively knitting in a uniform manner spaced courses in the finished stocking of separate independent yarns of silk so that irregularities in one yarn will be compensated for and balanced by irregularities in the associated independent yarns thereby more evenly distributing inequalities of the various yarns over the entire area of the stocking to give a more uniform appearance thereto and eliminate the formation of "rings".

An object of the present invention is to eliminate, by the operation of novel types of mechanisms, the formation of undesirable "rings" or "shadows" by drawing a plurality of independent knitting threads or yarns respectively from a plurality of independent sources of the same general character and count and feeding the independent or generally similar silk threads to the knitting needles, selectively, alternately or in other prescribed order so that none of the independent silk threads will be used to form more than a single course of loops in a given area of the fabric, composed of a number of immediate succeeding courses.

By selectively laying the different independent though similar threads to the needles of the machine, any irregular portions of any one of threads having a length exceeding that necessary for producing a single course of stitches will be withheld from immediately succeeding courses and inserted only after each of the others of the plurality of independent threads has been formed into a single course of stitches, such immediately succeeding courses being interknit or interlooped one with the other in the usual manner for forming plain fabric. Thus, such irregularities will be so distributed over the whole of the area of the fabric in such interspersed relation to the areas formed of the normal regular portions of the threads that no shadows or rings will be formed or the presence of such irregular thread portions discernible in the finished hosiery.

The present invention relates to a novel type of mechanism for performing the method and producing the type of stocking set forth and claimed in my co-pending application, Serial Number 660,414, filed 3/11 1933 and my co-pending application, Serial Number 675,305, filed 6/10 1933.

Referring to the drawings illustrating one of the many forms of my invention:

Figure 1 is a cross sectional view of a portion of a full fashion hosiery knitting machine showing my improved mechanism applied thereto.

Figure 2 is a perspective view of my improved mechanism.

Figure 3 is a detail side elevation of the pattern cam with associated parts.

Figures 5 to 10 inclusive, diagrammatically illustrate the relative arrangement of the selector and carrier bars.

Figure 11 is a perspective view of the carrier bars showing the locking devices associated therewith.

Figure 12 is a top plan view of one of the locking devices.

Figure 13 is a vertical sectional view of one of the locking devices, on line 13—13, Figure 12.

Figure 14 is a sectional view of the locking device on the line 14—14, Figure 12.

Figure 15 is a sectional view of the locking device on the line 15—15, Figure 12.

Figure 16 is a perspective view of one end portion of one of the carrier bars.

Figure 17:
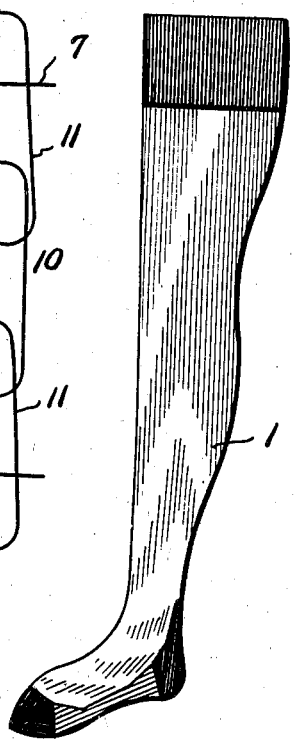
Figure 4:
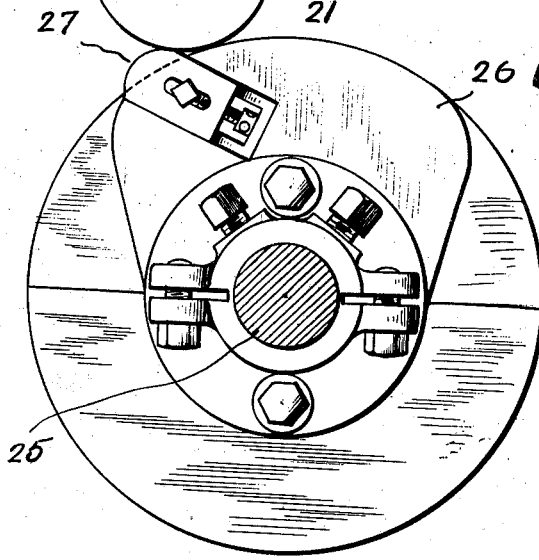
Figure 4 is a side elevation of the power cam, the shaft thereof being shown in section.

Figure 17 is a side elevation of a stocking constructed in accordance with my invention.

Figure 18:
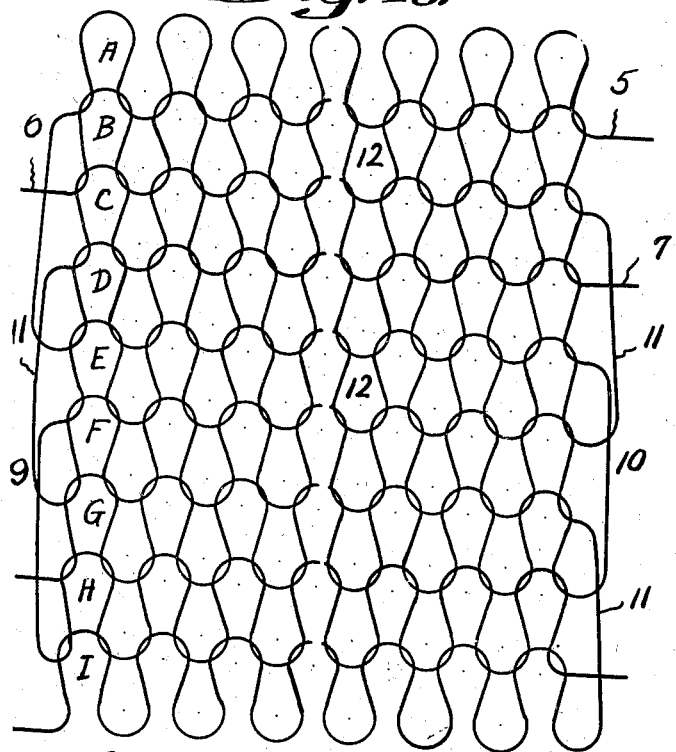

Figure 18 is a diagrammatic view of a portion of the knitted fabric from which the stocking is constructed.

As illustrated in Figures 17 and 18 and as set forth in detail in my co-pending applications above referred to, the stocking 1 consists of a leg fabric and a foot fabric having the major portion thereof knitted throughout its area of a plurality of independent yarns of natural silk, any number of which may be used but for the purpose of illustration I have used three yarns for forming independent courses separately and uniformly spaced throughout the area of the major portion of the stocking, particularly the leg and instep portion thereof. Referring to Figure 18, the letters A, B, C, D, E, F, G, H, and I designate nine knitted courses in the fabric and the numerals 5, 6, and 7 designate three yarns of individual silk and I again want to repeat that the number of yarns used may be increased or decreased for the accomplishment of desired objectives to meet specific requirements in the knitting of different types of stockings.

As shown in Figure 18, yarn 5 forms the first course A, the fourth course D and the seventh course G. Yarn 6 forms the second course B, the fifth course E and the eighth course H and yarn 7 forms the third course C, the sixth course F and the ninth course I. At the selvage edges 9 and 10 of the stocking are arranged floating stitches 11 that connect together the various courses formed by each independent thread. By forming predetermined spaced courses of separate independent yarns, I provide knitted areas 12, each area consisting of three courses and each formed from an independent yarn of natural silk thereby placing the structural features of one yarn directly opposite the structural features of the associated yarns for more evenly balancing in the finished stocking the irregularities in the various yarns. Course A is formed from yarn 5 and then course B is formed from yarn 6 and thereafter course C is formed from yarn 7, this forming of the three courses being repeated systematically throughout the entire area of the leg and instep of the stocking or any other portion thereof.

The present invention relates to a novel type of mechanism economically applied to a full fashion stocking knitting machine to enable the machine to properly function to produce a "ringless" stocking as above set forth.

Basicly my improved mechanism consists of a group of carrier bars of any desired number, such as three designated by the numerals 13, 14 and 15 which are selectively operated by a novel type of pattern mechanism including a selector 16. Each carrier bar is equipped with a slotted extension 17 into which may be inserted the lug 18 of the selector 16, the selector being shifted transversely of the knitting machine for selectively engaging the carrier bars to slide the same longitudinally.

As shown in Figure 11, each carrier bar is equipped with the usual form of thread guide 19 for laying the thread to the needles 20 of the knitting machine.

As shown in Figure 11, the bars 13, 14, and 15 control the independent similar charactered threads 5, 6, and 7.

Figure 5 illustrates the selector 16 engaging with the carrier bar 14 after being released from the carrier bar 13. The bar 14 and its thread 5 are then moved to the left thereby laying the threads 5 to the needles 20 for knitting the first course of loops.

The selector 16, Figure 6, then moves into engagement with bar 15 and carries the thread 6 to the right across the needles 20 for the second course of stitches of a predetermined area of the fabric after which the selector 16 engages bar 13 as shown in Figure 7 and moves the thread 7 to the left across the needles 8 for the third course. Thus, the threads 5, 6, and 7 form interlooped courses of stitches repeated in the order indicated and completes the first half of the preordered cycle of operation. The selector 16 then engages the bar 14 for the second time, Figure 8, and carries the end 5 across the needles 20 to the right for the formation of its second course at a position three courses removed from the course first formed by said thread 5.

The selector 16 then carries bar 15 and its thread 6 to the left as indicated in Figure 9 to produce a second course of stitches at a position three courses removed from the first course formed by thread 6. The selector 16 then engages bar 13 and carries the thread 7 across the needles 20, Figure 10, to the right for its second course at a position three courses removed from the first course formed by thread 7. This completes the preordered cycle of operation. By running the threads 5, 6, and 7 to the needles 20 in the manner above noted, each thread forms its particular single course of stitches in such spaced relation to each other as to distribute any irregularity occurring in the thread throughout the area of the fabric whereby such irregularities will be in interspersed relation to the courses formed by the other threads. Such irregularities are not experienced in the finished stocking thereby eliminating "rings" or "shadows" in the finished stocking.

While one prescribed order of thread laying for a given number of independent threads has been described it will be quite obvious to one skilled in the art that the number of threads and the order of laying the threads to the needles may be varied as desired, without departing from the essential features of the invention as set forth in the appended claims.

While the order of feeding the independent threads to the needles, as above noted, will not permit any one of the independent threads to make more than one course of stitches at any one time, it will be quite obvious that the selection of the carrier bars and the number of carrier bars may be such that each or any of the independent threads may be fed to the needles for making two successive courses, if desired, however, the single course for each thread is the more desirable mode of operation in order to break up and scatter as broadly as possible throughout the fabric any irregularity occurring in any single thread, to prevent the formation of rings or shadows, and while it is possible that two or more of the independent threads may run irregularities simultaneously, which would cause two or more successive courses respectively formed by these threads to contain irregular thread portions such occurrences are extremely infrequent.

An important feature of the present invention resides in providing simple substantial efficient mechanism for enabling the selector to perform its selective activities in relation to the various carrier bars. This mechanism or attachment to a full fashion knitting machine consists basically of a power device 21, a pattern mechanism 22, a selector actuating mechanism 23 and a locking device 24 for the carrier bars.

Power device

The power device consists of the usual main cam shaft 25 of a full fashion knitting machine to which is attached a power cam 26 having a relatively short cam surface 27 that coacts with the roller 28 rotatably mounted on the power lever 29 of the pattern mechanism 22.

Pattern mechanism

The pattern mechanism in addition to the power lever 29 consists of a ratchet wheel 30 fixed to a pattern cam 31 that is loosely mounted on the pattern shaft 32. Coacting with the ratchet wheel 30 is a dog 33 carried by an extension 34 of the lever 29 so that in the swinging movement of the lever 29 by coacting engagement of cam 27 with roller 28, the ratchet wheel 30 will be turned one tooth at a time for giving a step by step motion to the pattern cam 31. This pattern cam 31 is provided with a cam path 34B of an irregular shape so as to give the required movements to the actuating mechanism 23 to selectively move the selector 16 into engagement with the carrier bars.

To accomplish this result the cam path 34B consists of a plurality of cam sets, each set consisting of three cam sections, 35, 36 and 37, each adapted to selectively and variably move the actuating mechanism 23 to selectively engage the selector with the carrier bars.

Actuating mechanism

To accomplish this the cam path 34B coacts with a roller 38 constituting one of the elements of the actuating mechanism 23 and rotatably supported by the actuating lever 39 that has one end swingingly connected to a counter shaft 40 and its other end engaged by a spring 41. This lever 39 carries a catch 42 engaged with the frame of the knitting machine whereby the lever may be elevated to an inoperative position with the roller 38 out of engagement with the cam path 34. Fixed to the shaft 40 are crank arms 43 that are in turn connected to a supporting shaft 44 that has fixed thereto bars 45. These bars 45 are in turn fixed to a rod 46 upon which is slidably mounted the bearing 47 of the selector 16. The selector 16 is slidably mounted in the usual carrier bar friction box 48 of a full fashioned textile knitting machine thereby enabling the selector to slide longitudinally of the textile machine with the travel of the friction box and further allow the selector to slide transversely of the knitting machine independent of the friction box.

In the operation of parts just described, the power cam 26 periodically brings the cam surface 27 into engagement with roller 28 for periodically raising the lever 29 for advancing the ratchet wheel 30 by the dog 33. This periodic progressive movement of the ratchet wheel 30 progressively brings the cam sections 35, 36 and 37 into engagement with the roller 39 for periodically and progressively moving the lever 39 upwardly and downwardly for shifting the selector 16 in accordance with the movement of the crank arms 43 and bars 45. It will be appreciated that the lug 18 may be progressively moved back and forth over the carrier bars for selectively engaging individually the carrier bars. The sliding action between the bearing 47 and rod 46 enables the selector to slide independently of the actuating mechanism 23 so that the selector 16 may travel with the friction box in the operation of the particular carrier bar selected.

Locking devices

There are two locking devices for the carrier bars, one arranged at the left end of the bars and the other arranged at the right end of the bars and these devices are utilized not only to lock the carrier bars when reaching their limit of travel in either direction but absorbing the tendency of the bars to rebound when reaching their limit of travel. As the locking devices are of identical construction, the following description will be limited to the "left" locking device. As clearly shown in Figure 16, each carrier bar has each end shaped to provide a cam surface 49 and associated with this cam surface is an adjustably mounted catch plate 50 that has a notch 51 for coaction with certain parts of the locking device. To enable adjustment of the catch plate and assure proper registration of the notch 51 with a part of the locking device hereinafter described, the catch plate is provided with adjustment slots 52 in which are adjustably mounted screws 53 engaging with the carrier bar. Referring to Figures 12 to 15 illustrating views of the "left" locking device, it will be noted that the locking device consists of a block 54 adapted to be fixed to a part of the frame of the textile knitting machine. This block pivotally supports fingers 55, 56, and 57, one for each carrier bar. Each finger is pivotally mounted intermediate its ends with one end yieldably engaging a spring 58 and its other end 59 forked and loosely engaging the head 60 of a dog 61 that is adapted to detachably engage the notch 51. Pins 62, 63, and 64 are slidably mounted in the block and each pin coacts individually with each carrier bar, that is to say, surface cam 49 of a carrier bar is adapted to ride into engagement with a pin for elevating the same for selectively releasing the dog 61 from the notch 51 in a manner now to be described.

Referring to Figure 11, it will be noted that the fingers are designed to have overlapping engagement with each other and have portions offset so that the pin associated with one carrier bar will be operatively related with the dog associated with another carrier bar so that when the cam surface of one carrier bar moves into sliding engagement with its associated pin, this pin will be raised vertically to displace its associated finger and release a dog associated with another carrier bar.

Referring to Figure 12, I have indicated one carrier bar locked in the block, that is to say, this carrier bar is locked by the lower most dog 61 illustrated in Figure 12 and this bar has further raised pin 62 for elevating the uppermost dog illustrated in Figure 12 to release its bar which has traveled to the right. The incoming bar illustrated will engage pin 63 and due to the offset arrangement of the finger 56 associated therewith the dog 61 that has locked its bar will be released allowing the locked bar to travel to the left as indicated by the arrow.

Referring to Figures 11 and 12, bar 15 is in locked position and in engagement with dog 61 of finger 57 and pin 62 of finger 55 and bar 14 is about to enter block 54 for engagement with dog of finger 57 and pin 63 of finger 56 thereby elevating finger 56 and releasing dog 61 from the notch of bar 15 so that the same may be free to travel to the right. Thus, it will be appreciated that I provide automatic action for selectively locking and releasing the carrier bars for travel to the left and to the right.

Operation

In the full operation of my improved mechanism for the production of "ringless" stockings, the usual design of textile knitting machine with my invention applied thereto is set into operation with the result that carrier bar 14, as illustrated in Figure 5, is moved to the left for laying the thread 5 around the needles 20 for forming course A and when this has been accomplished, bar 15 as shown in Figure 6 is moved to the right for laying thread 6 to form course B and thereafter bar 13 as shown in Figure 7 is moved to the left for laying thread 7 around needles for forming course C and this progressive cycle of selective movements of the carrier bars is repeated progressively throughout the formation of the fabric.

In the selective engagement of the carrier bars, the selector 16 is selectively moved into connection with the carrier bars and this is accomplished by the actuating mechanism 23 which is given a step by step motion due to the engagement of the roller with the cam path of the pattern cam 31, that is to say, the cam path of pattern cam 31 is such, particularly the relative arrangement of the cam sections 35, 36, and 37 that the actuating mechanism 23 is operated to first move the selector 16 into engagement with bar 14 as shown in Figure 5 and then move the selector into engagement with bar 15 as shown in Figure 6 and thereafter moving the selector into engagement with bar 13 as shown in Figure 7 and repeating this action as the pattern cam 31 is advanced by the step by step motion of dog 33 operated in the movement of the power cam 26.

When the carrier bars reach their limit of travel in either direction the dogs 61 lock the same accurately in their limited position of travel so as to assure a perfect selvage edge to the fabric and further absorb any shock or tendency to rebound. In the movement of one carrier bar into locking position, this carrier bar automatically releases the associated carrier bar that has been previously locked in a manner hereinbefore set forth.

It is, of course, to be understood that various parts of the mechanism may be designed in other ways and associated in other relations and the mechanism may be utilized for other purposes than set forth. Therefore, I do not desire to be limited in protection in any manner whatsoever except as set forth in the following claims:

What I claim is:

1. In combination with a plurality of carrier bars of a full fashioned knitting machine, an attachment for selectively and progressively operating said carrier bars comprising, a friction box adapted to reciprocate longitudinally of the knitting machine; a selector carried by said friction box for reciprocating longitudinal movement therewith and mounted in said friction box for sliding movement in relation thereto transversely of the machine to selectively engage and operate any one of said carrier bars; actuating mechanism for said selector including a rod upon which said selector is slidably engaged for its free reciprocating longitudinal movement, a frame supporting said rod, arms carrying said frame and capable of oscillating to move the frame together with the rod to and fro over the knitting machine for sliding said selector in and out of its friction box transversely of the machine and thus set the selector in position for engagement with the selected carrier bar; a counter-shaft connected to said arms; a lever having one end fixed to said counter-shaft; a roller carried by said lever; a pattern cam having a compound curved cam path coacting with said roller whereby the lever is variably elevated to adjustably operate said arms; and power means for giving movements to said pattern cam.

2. In combination with the yarn carrier bars and the main cam shaft of a full fashioned knitting machine, a friction box adapted to reciprocate longitudinally of the knitting machine; a selector carried by said friction box for reciprocating longitudinal movement over the machine and mounted on said friction box for sliding movement in relation thereto transversely of the machine to selectively and progressively engage and operate any one of said carrier bars; actuating mechanism for said selector including a rod upon which said selector is slidably engaged for its free reciprocating longitudinal movement, a frame supporting said rod, arms connected to said frame and operable to move the same together with the rod to and fro over the knitting machine for sliding said selector in its friction box transversely of the machine and thus set the selector in position for engagement with the selected carrier bar; a counter-shaft connected to said arms; a lever having one end fixed to said counter-shaft; a roller carried by the lever; a pattern cam having a compound curved cam path coacting with said roller whereby the lever is variably elevated to place said arms in their various positions; and power means for giving movements to said pattern cam, said power means consisting of a power cam connected to the main cam shaft of the knitting machine, a lever operated by said power cam; and a pawl and ratchet connection between said lever and said pattern cam whereby the latter is given a step-by-step movement.

3. In combination with a plurality of carrier bars of a full fashioned knitting machine, an attachment for selectively and progressively operating said carrier bars comprising: a friction box adapted to reciprocate longitudinally of the knitting machine; a selector carried by said friction box for reciprocating longitudinal movement therewith and mounted in said friction box for sliding movement in relation thereto transversely of the machine to selectively engage and operate any one of said carrier bars; actuating mechanism for said selector including a rod upon which the selector is slidably engaged for its free reciprocating longitudinal movement; a frame supporting said rod; arms carrying said frame and capable of oscillating to move the frame together with the rod to and fro over the knitting machine for sliding said selector in and out of its friction box transversely of the machine and thus set the selector in position for engagement with the selected carrier bar to move the same from one to the other of its extreme positions; a counter-shaft connected to said arms; a lever having one end fixed to said counter-shaft; a roller carried by said lever; a pattern cam having a compound curved cam path coacting with said roller whereby the lever is variably elevated to adjustably operate said arms; power means for giving movements to said pattern cam; and means arranged upon the machine and disposed to releasably engage said bars upon being brought to extreme position by said selector.

4. In combination with three carrier bars of a full fashioned knitting machine, an attachment for selectively and progressively operating said carrier bars comprising: a friction box adapted to reciprocate longitudinally of the knitting machine; a selector carried by said friction box for reciprocating longitudinal movement therewith and mounted on said friction box for sliding movement in relation thereto transversely of the machine to selectively engage and operate any one of said three carrier bars; actuating mechanism for said selector including a rod upon which said selector is slidably engaged for its free reciprocating longitudinal movement; a frame supporting said rod; arms carrying said frame and capable of oscillating to move the frame together with the rod to and fro over the knitting machine for sliding said selector in and out of its friction box transversely of the machine and thus set the selector in position for its selecting engagement with one of said three carrier bars; a counter-shaft connected to said arms; a lever having one end fixed to said counter-shaft; a roller carried by said lever; a pattern cam having three camming sections relatively arranged to move in successive engagement with said roller whereby the lever is progressively elevated to three different levels to adjustably operate said actuating mechanism for disposing the selector in the required position for its selective engagement with one of the three carrier bars; and power means for giving movements to said pattern cam.

5. In combination with three carrier bars and the main cam shaft of a full fashioned knitting machine, an attachment for selectively and progressively operating said carrier bars comprising a friction box adapted to reciprocate longitudinally of the knitting machine; a selector carried by said friction box for reciprocating longitudinal movement therewith and mounted on said friction box for sliding movement in relation thereto transversely of the machine to selectively engage and operate any one of said three carrier bars; actuating mechanism for said selector including a rod upon which said selector is slidably engaged for its free reciprocating longitudinal movement; a frame supporting said rod; arms carrying said frame and capable of oscillating to move the frame together with the rod to and fro over the knitting machine for sliding said selector in and out of its friction box transversely of the machine and thus set the selector in position for its selecting engagement with one of said three carrier bars; a counter-shaft; a roller carried by said lever; a pattern cam having three camming sections relatively arranged to move in successive engagement with said roller whereby the lever is progressively elevated to three different levels to adjustably operate said actuating mechanism for disposing the selector in the required position for its selective engagement with one of the three carrier bars; and power means for giving movements to said pattern cam, said power means consisting of a power cam connected to the main cam shaft of the knitting machine, a lever operated by said power cam, and a pawl and ratchet connection between said lever and said power cam whereby the latter is given a step by step movement.

6. In combination with three carrier bars of a full fashioned knitting machine, an attachment for selectively and progressively operating said carrier bars comprising: a friction box adapted to reciprocate longitudinally of the knitting machine; a selector carried by said friction box for reciprocating longitudinal movement therewith and mounted on said friction box for sliding movement in relation thereto transversely of the machine to selectively engage and operate any one of said three carrier bars to move the same from one to the other of its extreme positions; actuating mechanism for said selector including a rod upon which said selector is slidably engaged for its free reciprocating longitudinal movement; a frame supporting said rod; arms carrying said frame and capable of oscillating to move the frame together with the rod to and fro over the knitting machine for sliding said selector in and out of its friction box transversely of the machine and thus set the selector in position for its selecting engagement with one of said three carrier bars; a counter-shaft connected to said arms; a lever having one end fixed to said counter-shaft; a roller carried by said lever; a pattern cam having three camming sections relatively arranged to move in successive engagement with said roller whereby the lever is progressively elevated to three different levels to adjustably operate said actuating mechanism for disposing the selector in the required position for its selective engagement with one of the three carrier bars; and power means for giving movements to said pattern cam; and means arranged upon the machine and disposed to releasably engage said bars upon being brought to extreme position by said selector.

WILLIAM MAURICE GROSSE.